(12) United States Patent
Adusumilli et al.

(10) Patent No.: US 6,223,232 B1
(45) Date of Patent: Apr. 24, 2001

(54) SYSTEM AND METHOD TO PREDICT CONFIGURATION OF A BUS TARGET

(75) Inventors: Swaroop Adusumilli; Subramanian S. Meiyappan, both of Tempe, AZ (US)

(73) Assignee: VLSI Technology, Inc., San Jose, CA (US)

( * ) Notice: Subject to any disclaimer, the term of this patent is extended or adjusted under 35 U.S.C. 154(b) by 0 days.

(21) Appl. No.: 09/255,407

(22) Filed: Feb. 22, 1999

(51) Int. Cl.$^7$ .................................................... G06F 13/14
(52) U.S. Cl. .................................................. 710/66; 710/33
(58) Field of Search ........................... 710/8–19, 104, 710/62–66, 33–35; 713/1, 2, 100

(56) References Cited

U.S. PATENT DOCUMENTS 6,081,859 * 6/2000 Munguia ............................. 710/107

* cited by examiner

Primary Examiner—Sumati Lefkowitz
(74) Attorney, Agent, or Firm—Wagner, Murabito & Hao LLP

(57) ABSTRACT

A target configuration prediction system that provides an initiator coupled to a bus system with a prediction of the configuration type of a target. The present invention stores information regarding the address and configuration of targets and utilizes this information to predict the address of a target an initiator is currently attempting to access. The prediction is based upon the proximity of stored target addresses to a target address an initiator is currently trying to access and the probability that targets with addresses within certain ranges are the same target configuration type. The configuration type is determined by initiator component logic during an initial attempt at accessing a target and a status bit indicating the configuration type is stored in a status bit component. In a retry situation, an initiator relies on the status bit indications stored in the status bit component to identify a target configuration, so that the initiator does not engage in configuration determination handshaking with a target in a retry situation.

20 Claims, 4 Drawing Sheets

SYSTEM AND METHOD TO PREDICT CONFIGURATION OF A BUS TARGET

FIELD OF THE INVENTION

The present invention relates to the field of electrical system bus configurations. More particularly, the present invention relates to a peripheral component interconnect (PCI) target configuration prediction system and method.

BACKGROUND OF THE INVENTION

Electronic systems and circuits have made a significant contribution towards the advancement of modern society and are utilized in a number of applications to achieve advantageous results. Electronic technologies such as digital computers, calculators, audio devices, video equipment, and telephone systems have facilitated increased productivity and reduced costs in analyzing and communicating data, ideas and trends in most areas of business, science, education and entertainment. Frequently, electronic systems designed to provide these results include a variety of components that communicate with each other via a communication bus such as a peripheral component interconnect (PCI) bus.

Typically a bus consists of several lines of electrically conductive material. The bus permits electrical signals representing data and control instructions to be readily transmitted between different components coupled to the bus. The order and speed of which the components interact with one another over the bus has a substantial impact on the performance of the computer system. For example, much of a computer systems functionality and utility is realized through the use of components referred as peripheral devices. Frequently the speed at which peripheral devices interact with the rest of the computer system is critical. For many peripheral devices, such as graphics adapters, full motion video adapters, small computer system interface (SCSI) host bust adapters, and the like, it is imperative that large block data transfers be accomplished expeditiously. For example, the speed at which a graphics adapter can communicate its responses is a major factor in the computer systems usefulness as an entertainment device. Hence the rate at which data can be transferred among various peripheral devices often determines whether the computer systems is suited for a particular purpose.

In order to maximize the benefits of electronic systems such as computers, the electronics industry has engaged in activities to develop several types a progressively faster bus architectures. Recently, the PCI bus architecture was developed to provide a high-speed, low latency bus architecture from which a larger variety of computer systems could be developed. As the number of applications which computers are used increases so does the demand for even greater bus performance capabilities. The bandwidth of a bus has a significant impact on its performance capabilities. Bandwidth is the amount of information communicated over the bus in a particular amount time. One way of increasing bandwidth is to change the configuration of the bus and components coupled to the bus. For example, increasing the number of bus lines that carry communication signals increases the bandwidth and thus over time the width or number of lines in a typical bus has increased.

These changes in bus and component configurations do not typically occur instantaneously for all components of a system and most systems are implemented with a degree of "backward" compatibility. In particular, changes in the configuration of devices coupled to a bus often lag behind configuration changes in the bus itself. For example, when PCI 2.1 specification standards were implemented to a take advantage of a wider 64-bit bus architecture many systems still relied upon 32 bit peripheral components resulting in a mixture of 64-bit and 32-bit masters (initiators) and slaves (targets) coupled to the same bus. Therefore, PCI 2.1 specification requires that 64 bit bus architectures maintain backward compatibility for 32-bit devices. This forces a 64-bit initiator to resolve the target configuration type (e.g., 32-bit or 64-bit) and frame#/irdy# signal resolution (in single transfers) before the 64-bit initiator proceeds with a data transfer. Apart from resolving the target type in a 64-bit environment, framing resolution is required whenever the initiator requests single 64-bit transfers. Framing resolution can take one clock to complete (e.g., when there is a 64-bit target) or multiple clocks to complete (e.g., when there is a 32-bit target).

In a typical multi configuration environment there is a target configuration recognition protocol that a master component engages in to determine the configuration of a slave component. For example in a 64-bit PCI environment the initiator accesses the bus searching for potential 64-bit targets and engages in a target configuration recognition protocol. Configuration determination handshaking occurs at the beginning of a transaction before a data transfer begins and therefore often delays communication of useful information between an initiator and a target. These configuration-determination delays increase the latency of communications on the bus and hence reduces the throughput. There is an initial configuration-determination latency in which clock cycles are expended determining what type of transfers are possible (e.g., whether a 32 bit or 64 bit transfer is possible). These clock cycles determining what type of transfers are possible are not available for primary data transfer activity (and are essentially wasted). In PCI bus architectures in which the configuration determination handshaking begins in a 64 bit configuration the power consumption is also increased due to switching of information from the upper 64 bit data lines to the lower 32 bit data lines for communications that involve 32-bit targets.

What is required is a system and method that minimizes communication delays due to configuration determination protocols in bus architectures that include a variety of initiator and target configurations. The number of overall clock cycles required to achieve primary data throughput should be decreased by providing an efficient and effective reduction of clock cycles expended on handshaking required to determine the configuration of a target. The system and method should reduce power consumption associated with switching of information from upper 64 bit PCI data lines to lower 32 bit PCI data lines for communications that involve 32-bit targets.

SUMMARY OF THE INVENTION

The present invention is a system and method that minimizes delays due to configuration determination protocols in bus architectures that include a variety of initiator and target configurations. The system and method of the present invention facilitates the efficient and effective reduction of clock cycles expended on handshaking required to determine the configuration of a target and decreases the number of overall clock cycles required to achieve primary data throughput. Power consumption associated with switching between configuration types during configuration determination handshaking is reduced. The present invention accomplishes this optimization of latency delays and power consumption expenditures by predicting a target configuration type associated with a pending bus communication.

One embodiment of the present invention includes a memory that maintains a list of target addresses and configuration profiles based upon previous accesses between an initiator and a target. The information in this memory is then used to predict the configuration type and inform the initiator of the configuration of a target (e.g., a 32 bit target or a 64 bit target) permitting the PCI initiator to reduce the amount clocks utilized for configuration determination handshaking. The prediction is based upon the proximity of stored target addresses to a target address an initiator is currently trying to access and the probability that targets with addresses within certain ranges are the same target configuration type. For example, a operating system assigns target addresses within a page to targets with similar configurations and the present invention utilizes this information to predict the configuration type of a target address within a page size range of stored target addresses.

BRIEF DESCRIPTION OF THE DRAWINGS

The accompanying drawings which are incorporated in and form a part of this specification, illustrate embodiments of the invention and together with the description, serve to explain the principles of the invention.

DETAILED DESCRIPTION OF THE INVENTION

Figure 1A:
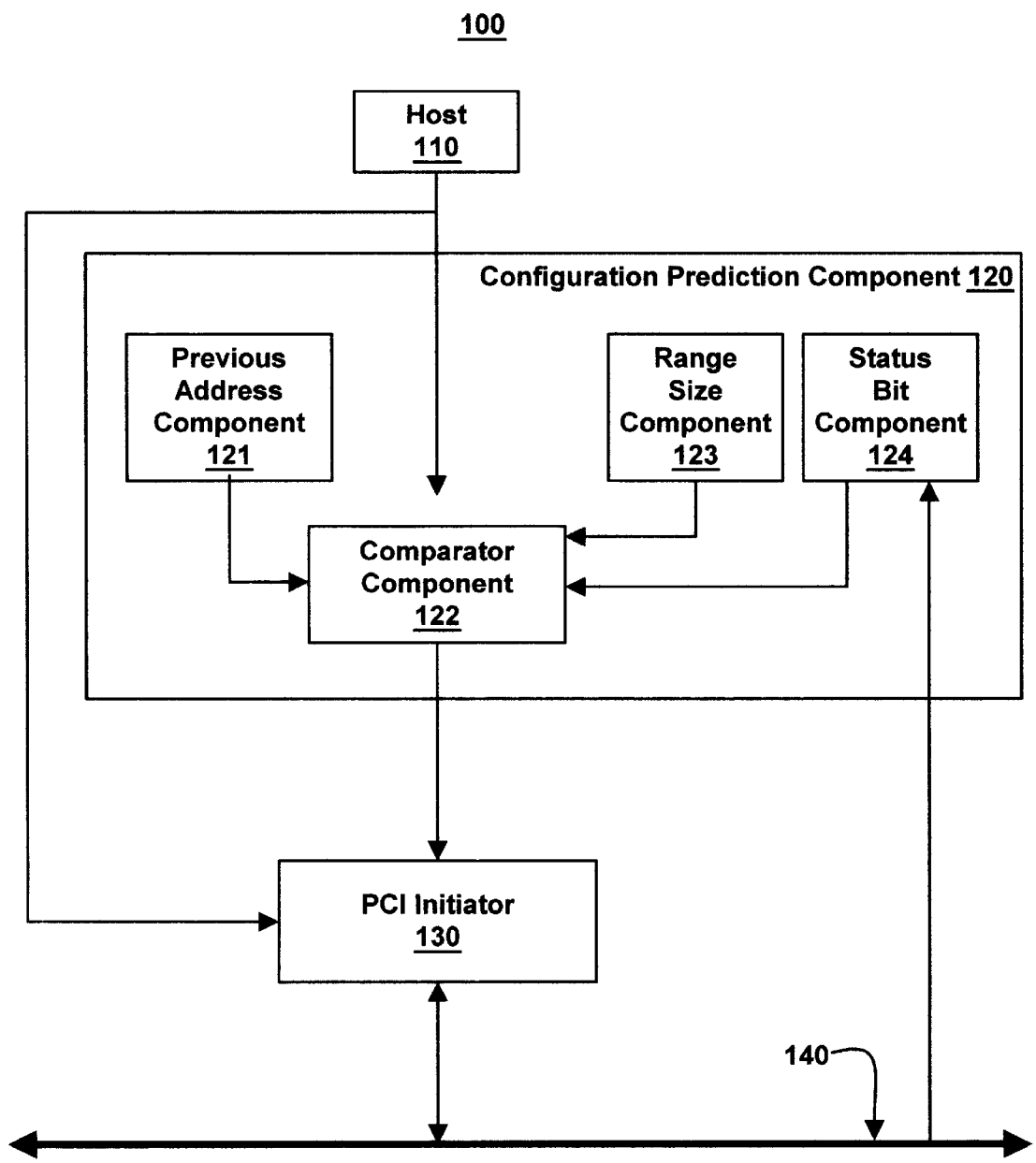
FIG. 1A is a block diagram illustration of a configuration prediction system, one embodiment of the present invention.

Reference will now be made in detail to the preferred embodiments of the invention, a target configuration prediction system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory or other electronic devices. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's electronic components and memories into other data similarly represented as physical quantities within the computer system electronic components or memories or other such information storage, processing, transmission or display devices.

The present invention facilitates the transfer of information in bus communication environments that include multiple types of initiators (masters) and targets (slaves) by predicting the target configuration type before a bus access begins. In one embodiment, the present invention stores information regarding target configuration types included in previous bus transactions and utilizes this information to predict the configuration type of a particular target.

For example, targets with an address within a particular range or page boundary are predicted to have the same type of configuration. In one embodiment the present invention operates in a PCI environment that includes 32-bit and 64-bit target configuration types. In yet another embodiment, the present invention relies upon retry address tracking and retention features of an initiator and utilizes a status bit component included in the initiator to track a target configuration type.

FIG. 1A is an illustration of configuration prediction system 100, one embodiment of the present invention. Configuration prediction system 100 comprises a host 110, a configuration prediction component 120, PCI initiator 130, and PCI bus 140. Configuration prediction component 120 is coupled to Host 110, PCI initiator 130 and PCI bus 140. PCI initiator 130 is coupled to host 110 and PCI bus 140. Host 110 performs operations that rely on information communicated via PCI bus 140 and drives the address, data and other information by PCI initiator 130 to initiate a bus transaction (e.g., whether the type of transfer is a single burst transfer or multiple burst transfer). PCI initiator 130 acts as an agent that engages in protocol activities required by PCI communication standards to determine the appropriate action such as driving frame#, irdy#, signals etc. For example, for a single data transfer frame# is asserted for only one clock cycle, but for a multiple burst transfers, frame# is kept asserted for as many cycles as required to complete the multiple bursts. PCI bus 140 provides a communication medium for the transmission of information in accordance with PCI protocol standards. Configuration prediction component 120 predicts the configuration type of a particular or target.

Configuration prediction component 120 comprises previous address component 121, comparator 122, range size component 123 and status bit (SB) component 124. Comparator component 122 is coupled to previous address component 121, range size component 123, status bit component 124, host 110 and PCI initiator 130. Status bit component 124 is coupled to PCI bus 140. In one embodiment of invention previous address component 121, range size component 123 and status bit component 124 include registers that store information associated with a range and a target's address and configuration type. Range size component 123 stores a range of addresses in a memory. Range size component 123 is written in one embodiment at boot up time or in another embodiment it is dynamically configured. Previous address component 121 stores an address of a target that was accessed previously. Status bit component 124 stores a status bit that indicates a target configuration type of the previously accessed target. Comparator component 122 determines if a target address that host 110 is currently attempting to access is within a range of a previously accessed target. Targets with addresses that fall within a particular range (page) are predicted to have the same target configuration.

The components of configuration prediction component 120 cooperatively operate to predict the configuration type of a target communication. Whenever host 110 initiates a PCI bus access operation, the address of the current ("new") target that host 110 is attempting to access is transmitted to comparator component 122. Comparator component 122 retrieves an address of a previously accessed target from previous address component 121 and a range or page size from range size component 123. Comparator component 122 utilizes the previous address component 121 and range retrieved from range size component 123 to establish address comparison boundaries. Comparator component 122 compares the address of a previously accessed target retrieved from previous address component 121 to the address of the target that host 110 is currently trying to access and determines if the address of the current ("new") target that host 110 is attempting to access falls within the address comparison boundaries. If the address of the target that the host is currently trying to access falls within the address comparison boundaries, comparator 122 retrieves the status bit from status bit component 124. Comparator component 122 then asserts a configuration indication signal (e.g., either cyc32 or cyc64 ) that matches the configuration indicated by the status bit to the companion PCI Initiator device.

In some implementations of configuration prediction component 120 operations, the address that host 110 is attempting to access falls outside of the comparison boundaries of a previous address range or page size. In these situations comparator component 122 drives a configuration indication signal to PCI initiator 130 that indicates configuration prediction component 120 is not able to predict the configuration of the target that host 110 is currently attempting to access. For example, in one embodiment of the present invention, comparator component 122 drives both a cyc32 and cyc64 signal low indicating that configuration prediction component 120 is not able to predict if a target that host 110 is attempting to access has a 32 bit configuration or a 64 bit configuration.

PCI initiator 130 utilizes the information received from configuration prediction component 120 to determine whether to engage in a target configuration recognition protocol before accessing a target. If configuration prediction component 120 indicates the configuration type of a target that host 110 is currently trying to access, PCI initiator 130 proceeds with appropriate PCI access protocol based upon the target configuration type supplied by configuration prediction component 120 (e.g., proceeds with a 32 bit or 64 bit transfer) without engaging in a target configuration type recognition handshake routine. If configuration prediction component 120 does not indicate the configuration type of a target that host 110 is currently trying to access, PCI initiator 130 proceeds with a configuration recognition protocol to determine the configuration type of the target that host 110 is currently attempting to access.

PCI initiator 130 engages in a 64 bit configuration determination handshaking in one embodiment of the present invention. PCI initiator 130 asserts a req64# signal that requests a target to identify if it has a 64-bit configuration capability (e.g., 64 bus lines). The initiator asserts a req64# signal at the same time it asserts frame# signal and waits for the target to drive devsel#. A target that host 110 is currently trying to access decodes the address and req64# signal before asserting a devsel# signal and responding with an a signal acknowledging or denying the target has a 64 bit configuration capability (e.g., ack64# signal assuming the targets are 64-bit wide). PCI initiator 130 examines (samples) the ack64# signal and if it is asserted PCI initiator 130 determines that the target is a 64 bit target. In one example, the PCI initiator 130 is a 64 bit initiator communicating with a 64 bit target that host 110 is currently attempting to access, thus 64 bus AD lines are used to transfer information. If the ack64# signal is not asserted it is an indication that the target is a 32 bit target and only a lower 32 AD line portion of the AD bus is utilized to transfer information. In this situation PCI initiator 130 takes the 64 bit configured information from the host and converts it into two 32 bit data and continues to burst the information over the lower 32 AD bus lines because it is communicating with a 32 bit target. Configuration prediction component 120 updates previous address component 121 with the address of the target that host 110 is attempting to communicate with. Configuration prediction component 120 also updates status bit component 124 with the resulting ack64# signal. This new information is used by a configuration prediction component 120 for future access attempts by host 110.

In one embodiment of the present invention, 64-bit extensions are used for memory accesses and configuration prediction component 120 utilizes this information to predict a target configuration type. The operating system divides the memory into equal pages (e.g., 4K with x86 processors, 8K with DEC alpha processors, etc.) and in this embodiment range component 123 stores a range size equal to the size of a page of addresses accessed from one memory and read into another memory (e.g., from a secondary memory to a main memory in a computer system). In another embodiment the range or page size is a custom value equal to the smallest granularity of a memory mapped target. For targets that are memory mapped, the operating system maps each page in the system addressing to a particular target configuration type depending upon a target's device driver requirements. Since no single page is shared between two targets in memory domain, the present invention predicts that a new address within a page boundary will be the same target configuration type.

In another embodiment of the present invention, multiple address holders and status bits hold a number of previous target types. Having additional address holders and status bits greatly improves the performance when a host is toggling between two targets in a spatial program. Utilizing the present invention to implement temporal based programs permits maximum throughput with one additional address holder and status bits in one embodiment of the present invention. The range or page size is fixed in some embodiment and changes in others. One embodiment of the present invention utilizes an algorithm to decide which target's information is replaced when there is not enough memory space to accommodate information associated with new targets.

Figure 1B:
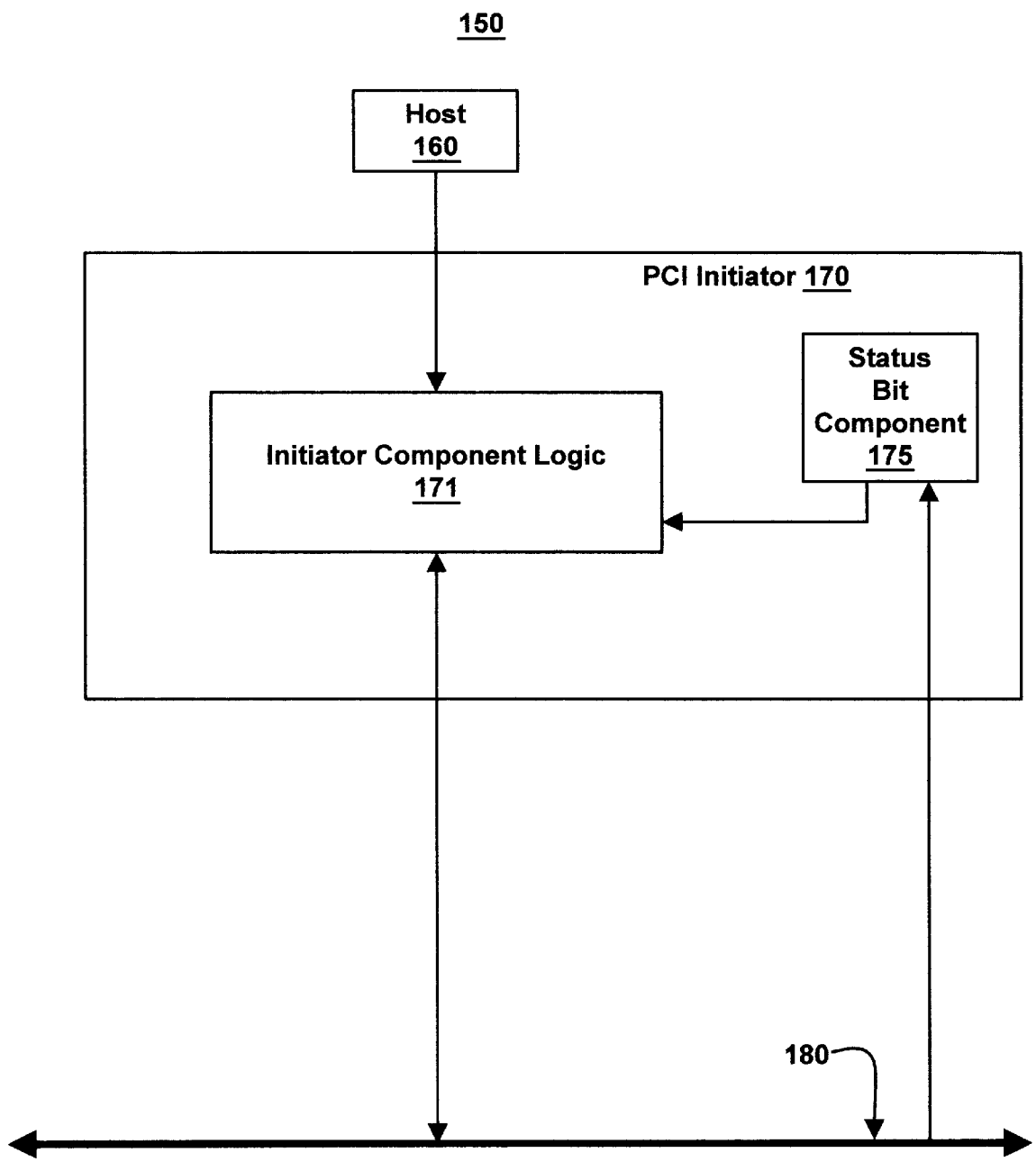
FIG. 1B is an illustration of a configuration prediction system, one embodiment of the present invention utilizing the retry address tracking and retention features of an initiator.

In yet another embodiment of the present invention, the configuration prediction feature is implemented in initiators to establish a target configuration type during retries and disconnect operations. This embodiment of the present invention relies upon retry address tracking and retention features of an initiator and utilizes a status bit component included in the initiator to track a target configuration type. Since an initiator already keeps a record of the just retried (disconnected) target address and now a configuration type associated with the target (e.g., 64-bit or 32-bit), an initiator avoids configuration determination hand shaking. FIG. 1B is an illustration of configuration prediction system 150 one embodiment of the present invention utilizing the retry address tracking and retention features of an initiator. Configuration prediction system 150 comprises a host 160, a PCI initiator 170, and PCI bus 180. PCI initiator 170 includes initiator logic component 171 and status bit component 175. Initiator logic component 171 performs PCI initiator functions including asserting a req64# signal, a frame# signal, and engaging in retry transactions. Status bit component 175 include registers that store information associated with a configuration type. The configuration type is determined by initiator component logic 171 during an initial attempt at accessing a target and a status bit indicating the configuration type is stored in status bit component 175. In a retry situation, PCI initiator 170 relies on the status bit indications stored in status bit component 175 to identify a target configuration. PCI initiator 170 does not engage in configuration determination handshaking with a target in a retry situation.

Figure 2:
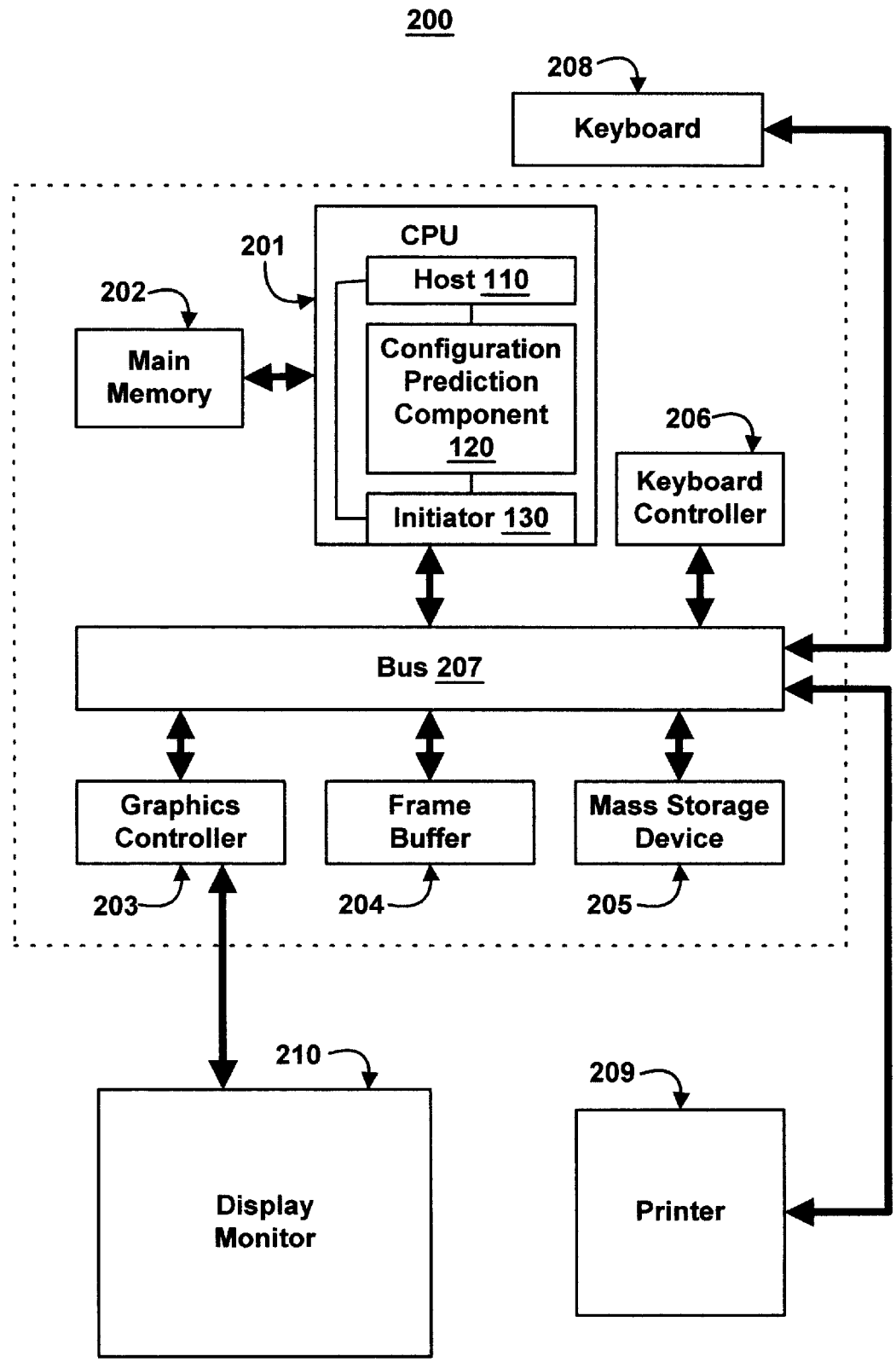
FIG. 2 shows a schematic of a computer system, one embodiment of the present invention.

FIG. 2 shows a schematic of one embodiment of a computer system 200 implementation of the present invention. Computer graphics system 200 comprises a central processing unit (CPU) 201, a main memory 202, graphics controller 203, frame buffer 204, mass storage device 205, keyboard controller 206, keyboard 208, printer 209, display monitor 210, and bus 207. Central processing unit (CPU) 201, graphics controller 203, frame buffer 204, mass storage device 205, keyboard controller 206, keyboard 208, and printer 209 are coupled to bus 207. Central processing unit (CPU) 201 is coupled to main memory 202. Display monitor 210 is coupled to graphics controller 203. CPU 201 handles most of the control and data processing. Main memory 202 provides a convenient method of storing data for quick retrieval by CPU 201. Graphics controller 203 processes image data in pipelined stages. Frame buffer 204 stores pixel parameter values. Mass storage device 205 stores data associated with multiple images and applications. Keyboard controller 206 controls keyboard 208, which operates as an input device. Printer 209 prints hard copies of graphical images and display monitor 210 displays graphical images.

Bus 207 enables components coupled to the bus to communicate with each other by carrying electrical signals between them. The components coupled to bus 207 act as initiators (masters) or targets (slaves). For instance, CPU 201 acts as an initiator when it accesses bus 207 to send a message over bus 207 to retrieve certain data stored in mass storage device 205. CPU 201 comprises a host component 110, a configuration prediction component 120 and a initiator component 130. CPU 201 utilizes the present invention and configuration prediction component to predict the configuration type of mass storage device 205. Mass storage device 205 acts as a target and upon receipt of this read request mass storage device 205 sends the requested data back via bus 207 to CPU 201. Once the CPU is finished processing the data, a signal can be sent via bus 207 to graphics controller 203 and then onto frame buffer 204 and display monitor 210 in the same manner with each component acting as an initiator utilizing the present invention to predict a target configuration type.

Figure 3:
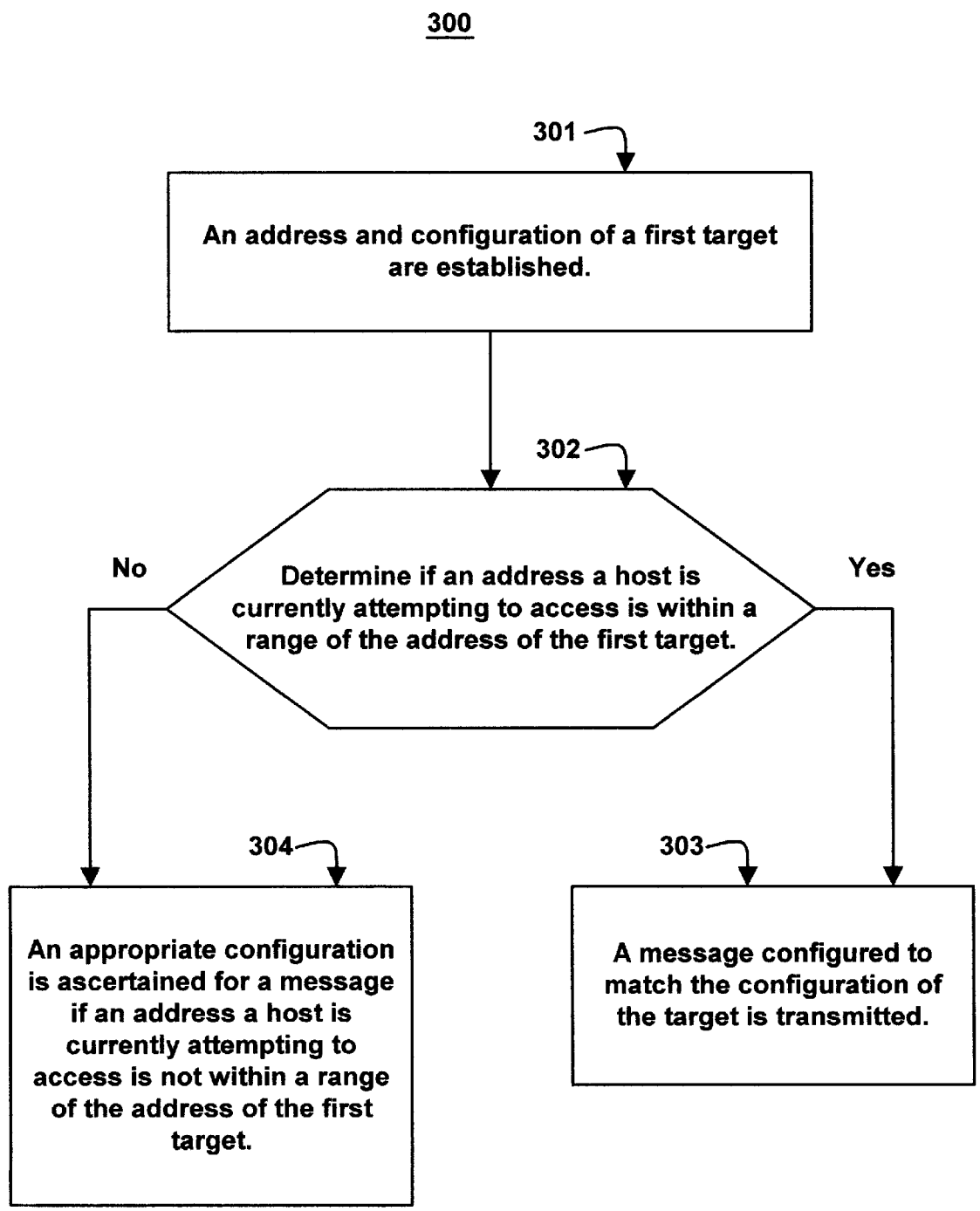
FIG. 3 is a flow chart illustrating steps in a target configuration prediction method, one embodiment of the present invention.

FIG. 3 is flow chart illustrating target configuration prediction method 300 one embodiment of the present invention. Configuration prediction method 300 predicts the configuration type of a target. In one embodiment, the present invention is implemented in a PCI bus environment including 32 bit configuration type and 64 bit configuration type targets and initiators.

In Step 301 an address and configuration of a first target is established. In one embodiment of the present invention a configuration of a first target is established by engaging in a handshaking protocol. An initiator requests the first target to identify a configuration of the first target to which the first target responds with an indication of the configuration type. The indication of the configuration type of the first target is stored in a memory. For example, an initiator asserts a req64# signal at the same time as a frame# signal. A first target decodes an address and req64# signal before asserting a devsel# signal and transmits a signal acknowledging or denying the first target has a 64 bit configuration. The initiator then samples an ack64# signal and saves an indication that the first target issuing the ack# signal has a 64 bit configuration. In another embodiment of the present invention a configuration of a first target is established by loading an address and configuration of a first target in a memory.

In Step 302 configuration prediction method 300 determines if an address a host is currently attempting to access is within a range of the address of the first target. In one embodiment of the present invention, address comparison boundaries are established by adding a range to and subtracting a range from an address of a target a host is currently attempting to access. The address a host is currently attempting to access is compared to the address comparison boundaries and if the address the host is currently attempting to access falls within the address comparison boundaries an initiator begins a bus access in a particular configuration. In one embodiment the access is configured to match a configuration of a previously accessed first target with an address that also falls within the address comparison boundaries.

A message configured to match the configuration of the target is transmitted in Step 303 if an address a host is currently attempting to access is within a range of the address of the target (e.g., within a comparison boundary established in Step 302). For example a 32 bit PCI message is transmitted if the first target is a 32 bit configuration type or a 64 bit PCI message is transmitted if the first target a 64 bit configuration type. In one embodiment the message is transmitted in accordance with PCI protocol standards. An initiator starts the transaction by asserting a frame# signal driving an address onto ad bus and command onto cbe# bus and a target the host is currently attempting to access responds with the appropriate trdy# and devsel# signal.

In Step 304 an appropriate configuration is ascertained for a message if an address a host is currently attempting to access is not within a range of the address of the first target. In one embodiment the initiator follows essentially the same configuration determination protocol as in Step 301 except the initiator engages in the configuration determination protocol with a second target the host is currently attempting to access. An initiator requests the second target to identify a configuration type to which the second target responds with an indication of the configuration type. The indication of the configuration type of the second target is stored in configuration prediction component. For example, an initiator asserts a req64# signal at the same time as a frame# signal. A second target decodes an address and req64# signal before asserting a devsel# signal and transmits a signal acknowledging or denying the second target has a 64 bit configuration (e.g., ack64#). The initiator then begins a 64 bit access if the signal acknowledges the second target has a 64 bit configuration or the initiator begins a 32 bit access if the signal does not acknowledge the second target has a 64 bit configuration. An address and configuration of the second target is established by storing it in memory similar to step 301.

Thus, the present invention minimizes delays due to configuration determination protocols in bus architectures that include multiconfiguration initiators and targets. The system and method of the present invention efficiently and effectively predicts a target type configuration. The present invention saves power by driving a constant value on the upper 32 data bits and byte enables during 32-bit transfers and eliminating 64 bit configuration The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A peripheral component interconnect (PCI) target configuration prediction system comprising:
   a PCI bus for communicating information in PCI transactions;
   a PCI initiator component for inter-acting with said PCI bus, said PCI initiator coupled to said PCI bus;
   a configuration prediction component for predicting the configuration of a target, said configuration prediction component coupled to said PCI initiator component and further comprising:
   a comparator for comparing the address of a previously accessed target to the address of a current target said host component is currently trying to access by determining if the address of said current target said host is attempting to access falls within predetermined address comparison boundaries and asserting a configuration indication signal;
   a previous address component for storing said address of said previously accessed target, said previous address component coupled to said comparator component;
   a range size component for storing a range or page size of addresses associated with targets, said range size component coupled to said previous address component; and
   a status bit component for storing a status bit that indicates a target configuration type, said status bit component coupled to said comparator; and
   a host for initiating said PCI transactions and identifying a target address, said host coupled to said PCI initiator component and said configuration prediction component.

2. The PCI target configuration prediction system of claim 1 in which said configuration prediction component, previous address component, range size component and status bit component include registers that store information regarding target configuration types.

3. The PCI target configuration predication system of claim 1 in which targets with addresses that fall within a particular rage or page size have the same target configuration.

4. The PCI target configuration prediction system of claim 1 in which said configuration prediction component directs said initiator component to utilize a specific target configuration type for a particular bus access.

5. The PCI target configuration prediction system of claim 4 in which said configuration predication component directs said initiator component to utilize a 32 bit configuration type for said particular bus access.

6. The PCI target configuration prediction system of claim 4 in which said configuration predication component directs said initiator component to utilize a 64 bit configuration type for said particular bus access.

7. The PCI target configuration prediction system of claim 4 in which said configuration predication component directs said initiator component to utilize a target configuration type that matches an indication of a configuration type of a first target.

8. A peripheral component interconnect (PCI) target configuration prediction component comprising:
   a comparator for comparing the address of a previously accessed target to the address of a current target said host component is currently trying to access by determining if the address of said current target said host is attempting to access falls within predetermined address comparison boundaries and asserting a configuration indication signal;
   a previous address component for storing said address of a previously accessed target, said previous address component coupled to said comparator component;
   a range size component for storing a range or page size of addresses associated with targets, said range size component coupled to said previous address component; and
   a status bit component for storing a status bit that indicates a target configuration type, said status bit component coupled to said comparator.

9. The PCI target configuration prediction system of claim 8 in which the range or page size is a custom value equal to the smallest granularity of a memory mapped target.

10. The PCI target configuration predication system of claim 8 in which said range size component is written at boot up time.

11. The PCI target configuration predication system of claim 8 in which said range size component is dynamically configured.

12. A peripheral component interconnect (PCI) target configuration prediction method comprising the steps of:
   a establishing an address and configuration of a first target;
   b determining if an address a host is currently attempting to access is within a range of said address of said first target;
   c transmitting a message in a configuration that matches said configuration of said first target if an address a host is currently attempting to access is within a range of said address of said first target; and d ascertaining an appropriate configuration for a message if an address a host is currently attempting to access is not within a range of said address of said first target.

13. The PCI target configuration prediction method of claim 12 in which step a further comprises the steps of:

requesting said first target to identify a configuration of said first target;

responding with an indication of said configuration of said first target; and storing said indication of said configuration of said first target.

14. The PCI target configuration prediction method of claim 12 in which step a further comprises the step of engaging in a handshaking protocol to establish an address and configuration of said first target.

15. The PCI target configuration prediction method of claim 14 further comprising the steps of:

asserting a req64# signal at the same time as a frame# signal;

decoding an address and req64# signal before asserting a devsel# signal; and transmitting a signal acknowledging or denying said first target has a 64 bit configuration.

16. The PCI target configuration prediction method of claim 14 further comprising the steps of:

sampling an ack64# signal; and saving an indication that said first target issuing said ack64# signal has a 64 bit configuration.

17. The PCI target configuration prediction method of claim 12 in which step a further comprises the step of loading said address and said configuration of said first target in a memory.

18. The PCI target configuration prediction method of claim 12 in which step b further comprises comparing said address said host is currently attempting to access to addresses within a range of said address of said first target.

19. The PCI target configuration prediction method of claim 12 in which step b further comprises calculating an address comparison boundary.

20. A peripheral component interconnect (PCI) target configuration prediction system comprising:

a PCI initiator component for inter-acting with targets via a PCI bus; said PCI initiator including:

an initiator logic component for performing PCI initiator functions including asserting a req64# signal, a frame# signal, and engaging in retry transactions; and a status bit component for storing a status bit that indicates a target configuration type, said status bit component coupled to said initiator logic component, wherein said status bit component stores information regarding a target configuration type designation established during an initial access of said target and said initiator logic component relies on said target configuration type indication stored in said status bit component to establish a target configuration type in retry target accesses.

* * * * *